United States Patent [19]
Lewis

[11] 3,865,127
[45] Feb. 11, 1975

[54] PRESSURE CONTROL ARRANGEMENTS FOR AIR COMPRESSORS

[75] Inventor: Geoffrey Arthur Lewis, Solihull, England

[73] Assignee: Lucas Aerospace Limited, Birmingham, England

[22] Filed: Jan. 29, 1973

[21] Appl. No.: 327,771

[30] Foreign Application Priority Data
Jan. 29, 1972 Great Britain...................... 4312/72

[52] U.S. Cl.................. 137/115, 137/118, 137/117
[51] Int. Cl....................... G05d 11/00, F16k 17/22
[58] Field of Search............ 137/115, 116, 117, 502

[56] References Cited
UNITED STATES PATENTS
| | | | |
|---|---|---|---|
| 2,746,250 | 5/1956 | Hawkins | 137/115 X |
| 2,922,431 | 1/1960 | Vensen | 137/117 |
| 3,021,859 | 2/1962 | Liantonio et al. | 137/502 X |

Primary Examiner—William R. Cline
Attorney, Agent, or Firm—Holman & Stern

[57] ABSTRACT

A pressure control arrangement for an air compressor comprises two venturis connected in parallel to the compressor outlet and respectively discharging to an external apparatus and to atmosphere. A servo operated spill valve, downstream of the venturi which discharges to the external apparatus, is responsive to signal pressures from the venturi throats. A further valve, is responsive to an increase in pressure downstream of said spill valve to modify one of the signal pressures so as to open the spill valve.

8 Claims, 1 Drawing Figure

PATENTED FEB 11 1975 3,865,127
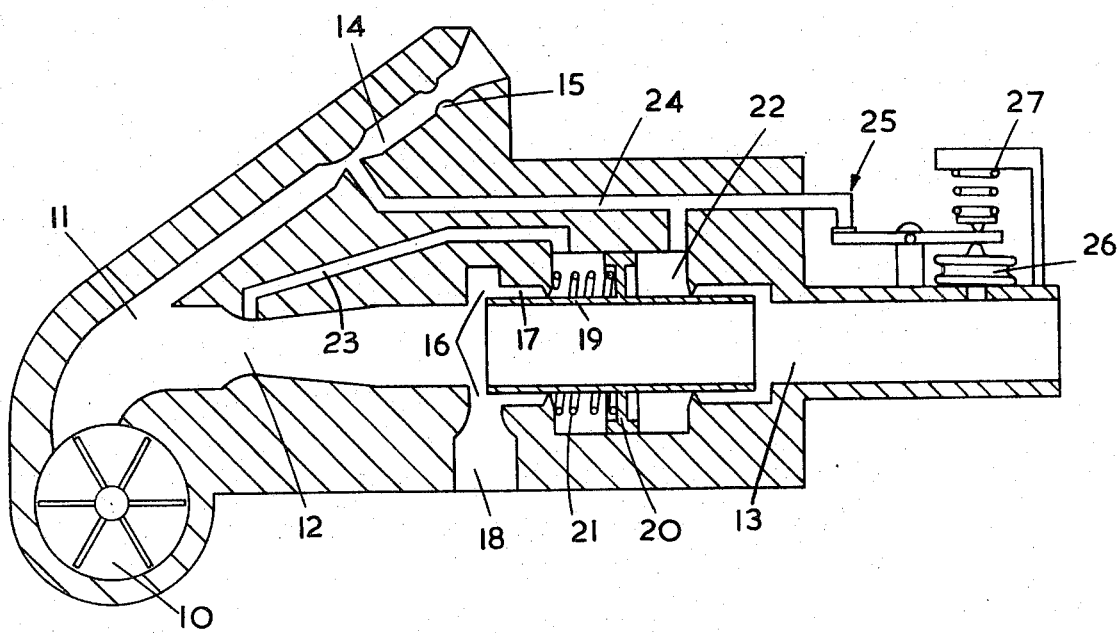

PRESSURE CONTROL ARRANGEMENTS FOR AIR COMPRESSORS

This invention relates to a pressure control arrangement for an air compressor.

According to the invention a pressure control arrangement for an air compressor comprises a first venturi through which air flows, in use, from the compreessor to an external apparatus, a second venturi through which air can flow from the compressor to a low pressure, and a servo-operated valve means responsive to an increase in a first pressure signal at the throat of the first venturi, or to a decrease in a second pressure signal derived from the pressure at the throat of the second venturi, to spill air from the downstream side of the first venturi.

An example of the invention will now be described with reference to the accompanying drawing, which shows a pressure control arrangement diagrammatically.

An air compressor 10 has an outlet 11 communicating with a venturi 12 through which air can flow, via a passage 13, to an external apparatus, (not shown). Outlet 11 also communicates with a further venturi 14 through which air can flow, via a flow restrictor 15, to atmosphere. The throat area of venturi 14 is one hundredth of the throat area of venturi 12.

Surrounding passage 13 and communicating therewith by means of ports 16 is an annular chamber 17. Chamber 17 also communicates with a dump port 18. A cylindrical closure member 19 for ports 16 is sealingly slidable within passage 13. Secured to member 19 is a piston 20. A light spring 21 engages piston 20 to bias member 19 in a direction to open ports 16.

Piston 20 is sealingly slidable in a cylinderical chamber 22, opposite ends of which respectively communicates, via passages 23, 24 with the throats of venturis 12, 14 the arrangement being that an increase in pressure in the throat of venturi 12 acts on piston 20 to urge member 19 to open ports 16.

Passage 24 also communicates with atmosphere via a valve 25 operable by a resilient bellows unit 26 responsive to the pressure in passage 13 downstream of ports 16, an increase in this pressure acting to open valve 25. Valve 25 is biased shut by a spring 27.

In use, air flows from compressor 10 via venturi 12 and passage 13 to the external apparatus, and via venturi 14 and restrictor 15 to atmosphere. Restrictor 15 is selected so that the mass flow through venturi 14 is approximately one hundredth of the mass flow through venturi 12. Under normal values of load by the external apparatus, the ratio of the mass flow to the throat area of venturi 14 is nearly the same as this ratio for venturi 12. In these conditions the pressures in the throats of venturis 12, 14 are also nearly equal. In fact, the pressure in the throat of venturi 14 is just sufficiently larger than that in venturi 12 as to overcome spring 21 and shut ports 16.

If the pressure in passage 13 and venturi 12 rises due to the external load, member 19 is urged to open ports 16 until the pressure in venturi 12 returns to a level at which piston 20 is again in equilibrium. A subsequent reduction in pressure in venturi 12 similarly causes ports 16 to be progressively shut to restore equilibrium.

Should the pressure in passage 13 be sufficient to cause bellows 26 to overcome spring 27, the valve 25 is opened. Valve 25 acts as a pilot valve to reduce the pressure in passage 24 and thereby cause ports 16 to be opened wide.

I claim:

1. An apparatus for controlling the pressure of compressed air delivered from a compressor outlet to external apparatus, comprising in combustion first and second venturi means including inlets connected in parallel with an air compressor outlet; first passage means operatively connected to said first venturi means through which compressed air flows from said first venturi means to the external apparatus; second passage means operatively connected to said second venturi means for supplying a substantially constant source of low pressure control air;

dump valve means operatively connected in said first passage means downstream of said first venturi means for spilling air from the first passage means to the atmosphere, said dump valve means including pressure-responsive actuating means having operating portions respectively operatively connected to and subject to opposed pressures from first and second venturi throat means and disposed downstream of the first venturi means and movable in opposite directions for controlling the amount of air spilled to the atmosphere and delivered to the external apparatus being controlled, and pressure modifying means operatively connected to said first passage means downstream of said dump valve means and including an operating portion subject to pressure in said first passage means and including means operatively connected to said second passage means for reducing the control pressure in said second passage means in response to excessive pressure in said first passage means.

2. An arrangement as claimed in claim 1 in which said pressure modifying means comprises a control valve communicating with the throat of said second venturi means, a device responsive to an increase in pressure downstream of said dump valve means to open said control valve, and spring means normally biasing said control valve against movement by said device.

3. An arrangement as claimed in claim 2 in which said pressure responsive device comprises a resiliently deformable bellows unit communicating with said first passage means downstream of said dump valve means.

4. An arrangement as claimed in claim 2 in which said second venturi means has a throat area which is substantially smaller than the throat area of said first venturi means.

5. An arrangement as claimed in claim 4 which includes a flow restrictor operatively connected downstream of said second venturi.

6. An arrangement as claimed in claim 5 in which the dimensions of said flow restrictor are such that, in use, the ratio of the air mass flow through said first and second venturi means is approximately equal to the ratio of the throat areas of said first and second venturi means.

7. An arrangement as claimed in claim 6 in which the throat dimensions of said flow restrictor and of said first and second venturi means are such that, when said pressure means is not operated, pressure downstream of said dump valve means maintains said dump valve means shut.

8. The arrangement as claimed in claim 1 in which said actuating means comprises a reciprocable piston defining opposed, variable volume chambers operatively connected to and responsive to pressures in throats of the respective venturi means, said dump valve means comprising port means communicating with said first passage means downstream of said first venturi throat means and with the atmosphere, a closure member operatively connected to and movable by said piston means and including a closure portion controlling air movement through said port means, and spring means operatively connected to and normally biasing said closure member toward a port-opening position.

* * * * *